May 29, 1945. G. E. R. SALEH 2,377,186
LOCK NUT
Filed Jan. 19, 1944

INVENTOR.
GABRIEL E. ROHMER SALEH
BY Irving Seidman
ATTORNEY

Patented May 29, 1945

2,377,186

UNITED STATES PATENT OFFICE 2,377,186

LOCK NUT

Gabriel E. Rohmer Saleh, New York, N. Y.

Application January 19, 1944, Serial No. 519,075

2 Claims. (Cl. 151—8)

This invention relates to improvements in lock nuts.

Broadly, it is an object of my invention to provide standard and other type of nuts with simple means, easily manufactured for effective and permanent locking of such nuts.

While lock nuts are not new and means of locking nuts as described herein and having my advantages has not been heretofore revealed in the patented art; I provide a plurality of partially threaded dowels made of plastic material or of ductile metals positioned adjacent the threaded bore of the nut within channels and so formed that when the nut is tightened in position the dowel will be held under great and constant compression thus holding the nut firmly in place so that no vibration will loosen it.

For a fuller understanding of the nature and objects of my invention, reference is had to the following detailed description in connection with the accompanying drawing, in which Fig. 1 is a longitudinal cross section of a nut provided with the dowels.

Figure 1:
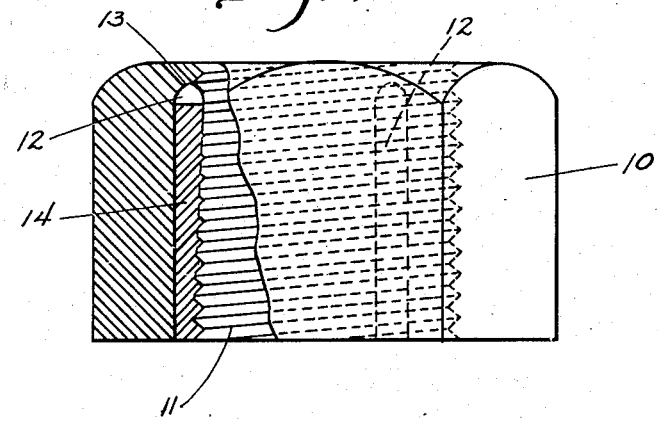
Figure 3:
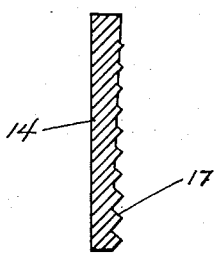
Figs. 3 and 4 show dowels of different shape for use with the nut.

Referring to the drawing, Fig. 1 shows a standard nut 10 with an interior thread 11 which may be of standard or special pitch. The nut 10 is provided with a plurality of channels 12 running parallel with the axis of the nut. Channels 12 extend almost to the top of the nut and stop at 13 as shown in Fig. 1. Dowels 14, preferably made of ductile metal, such as lead, aluminum, copper and their alloys, are provided for channels 12 so that the dowels 14 when placed within the channels 12 also run parallel with the axis of the nut. Dowels 14 are provided with a plurality of fully cut threads 17 at the ends adjacent the base of the nut while the pitch of the thread varies and recedes, as shown in Fig. 3, until it merges at the inside diameter of the nut 10.

When nut 10, containing dowels 14 within channels 12, is tightened upon a bolt 15, the bolt 15 easily and freely enters the nut 10 since the full threads of the dowels at the base of the nut eliminates any chance of stripping of the threads. As the bolt 15 continues to enter the nut 10, the ductile metal of dowels 14 are tightly wedged within channels 12 while the threads of the bolt 15 cut deeper and additional threads in the dowels packing the ductile metal between the threads of the nut 10 and bolt 15. Since the channels 12 do not run through the nut, the ductile metal of the dowels 14 cannot be squeezed out at the top of the nut thus obtaining sufficient compression to firmly lock the nut in position.

Figure 2:
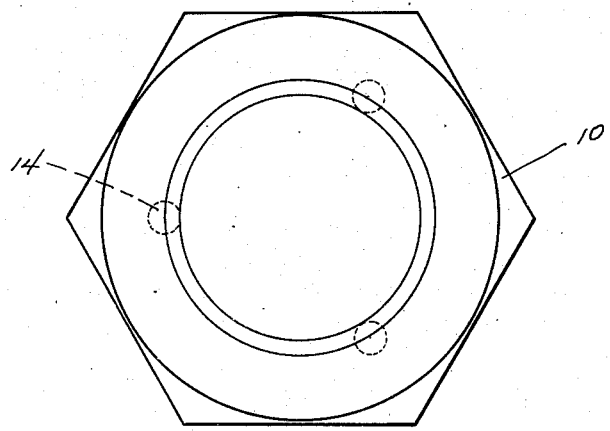
Fig. 2 is a plan view of the nut shown in Fig. 1.

I prefer to locate dowels 14 at 120° from each other as shown in Fig. 2, however, a greater or lesser number of dowels may be used.

Figure 4:

Fig. 4 shows a modified dowel in the form of a truncated cone. When this form is used, the channels in the nut are adapted to house and receive them.

Figure 5:
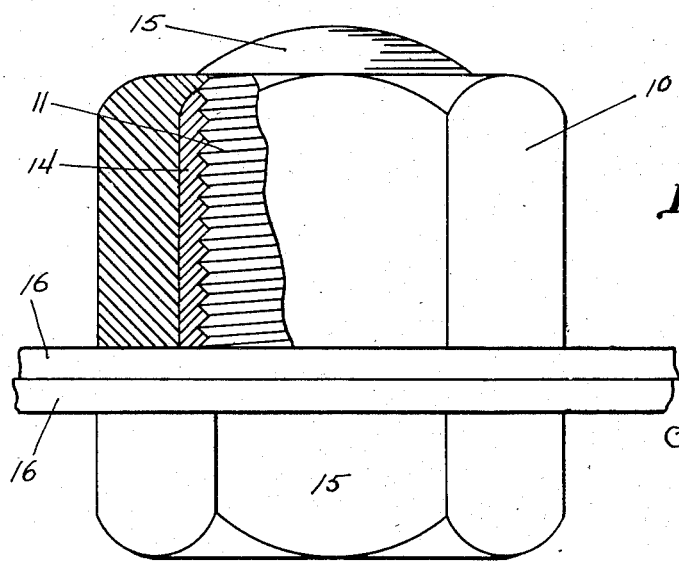
Fig. 5 shows an assembly of a nut and bolt with the dowels under compression.

The drawing in Fig. 5 reveals that when the nut 10 is bolted in position upon bolt 15, the plate 16 forms a seat to prevent the dowel material from squeezing out although it is displaced by the threads of the bolt which cut full threads in the unthreaded and partially threaded portions of the dowels. The dowel material is squeezed and compressed into any open space or wherever there may be play between the threads of the nut and bolt to provide a firm locking action, and is also carried on the threads of the respective parts.

The dowels 14 may be placed within the channels 12 and held sufficiently tight so that the nuts can be stripped with the dowels in place for ready use.

Although a ductile metal is preferred, fiber materials and plastic compounds, or combinations of same, and like materials may be used for dowels.

It is obvious that various changes and modifications may be made in the details of construction without departing from the general spirit of the invention, as set forth in the appended claims.

I claim:

1. A lock nut of the character described having a plurality of blind cavities located in between the threaded and the outside portion of said nut and disposed parallel with the axis of said nut, dowels of ductile material securely fitted within the said cavities, said dowels not extending throughout the full height of the nut, said dowels having a series of threads only at their ends adjacent to the base of said nut, in coincidence with the threads of said nut, said dowels, above said series of threads extending into said threaded portion of the nut sufficiently so that the bolt upon which the nut is threaded will cut threads therein and in so doing will compress said dowels to completely fill the cavities and compact said dowels therein and against the threads of the bolt.

2. A lock nut of the character described having a plurality of blind cavities located in between the threaded and the outside portion of said nut, dowels of ductile material securely fitted within the said cavities said dowels not extending throughout the full height of the nut, said dowels having a series of threads only at their ends adjacent to the base of said nut, in coincidence with the threads of said nut, said dowels, above said series of threads extending into said threaded portion of the nut sufficiently so that the bolt upon which the nut is threaded will cut threads therein and in so doing will compress said dowels to completely fill the cavities and compact said dowels therein and against the threads of the bolt.

GABRIEL E. ROHMER SALEH.